United States Patent [19]

Chambers

[11] 4,223,452
[45] Sep. 23, 1980

[54] DRYING PROCESS AND APPARATUS FOR ACCOMPLISHING THE SAME

[76] Inventor: John M. Chambers, 541 Tremont Ave., Westfield, N.J. 07090

[21] Appl. No.: 11,564

[22] Filed: Feb. 12, 1979

[51] Int. Cl.$^3$ .............................................. F26B 3/16
[52] U.S. Cl. ........................................ 34/28; 34/35; 34/169; 34/171; 34/177
[58] Field of Search ....................... 426/7, 643, 31, 11, 426/493, 4; 165/164; 34/168, 169, 171, 178, 177, 33, 65, 27, 28, 35

[56] References Cited

U.S. PATENT DOCUMENTS

| | | | |
|---|---|---|---|
| 1,587,101 | 6/1926 | Woolner | 426/11 |
| 2,622,342 | 12/1952 | Goulounes et al. | 34/169 |
| 3,249,442 | 5/1966 | Keyes et al. | 426/7 |

Primary Examiner—Larry I. Schwartz
Attorney, Agent, or Firm—Morgan, Finnegegan, Pine, Foley & Lee

[57] ABSTRACT

A process and apparatus for drying wet solid material are provided. The process comprises introducing material into a dryer, bringing it into contact with one side of a plurality of heated surfaces located therein and vaporizing liquid in the material. The liquid is withdrawn from the dryer, compressed to a pressure greater than in the dryer and returned to the other side of the heated surfaces where, upon condensation, latent heat energy is released therefrom and used to vaporize liquid in material on the opposite side of the heated surfaces, withdrawing the condensate from the heated surfaces and substantially dried solids from the dryer.

The apparatus comprises a housing having entrance and exit openings and means for delivering material into and dried material therefrom located in the openings and isolating the dryer interior from the outside atmosphere. A plurality of hollow heat exchange means connected to an external heat source and to atmosphere are disposed in the interior of the dryer. Compressor means are connected to the housing in the vicinity of the entrance opening and to the hollow heat exchange means and operate at positive pressure with respect to the pressure in the housing, thus vaporized liquid is withdrawn from the housing and compressed and led to the hollow heat exchange means, condensed, giving up its latent heat energy, and vaporizing the liquid in wet material on the opposite surfaces of the heat exchange means.

16 Claims, 3 Drawing Figures

DRYING PROCESS AND APPARATUS FOR ACCOMPLISHING THE SAME

This invention relates to a drying process and apparatus for accomplishing the same. More particularly, the invention relates to a vapor recompression drying process and apparatus for carrying out such a process.

BACKGROUND OF THE INVENTION

In a wide variety of industrial processes the primary product or by-product is at one time or another present as solid material wet with a liquid. This solid material must be produced as a "dried product." The drying operation is normally carried out in a so-called dryer.

There are two primary types of dryers. In one primary type, heat surfaces heated by steam under pressure are provided and the wet solid material being dried does not come into direct contact with the steam. In the other primary type, hot gasses are brought into direct contact with the wet solid material. In each case, the heat added must equal the sensible heat of the mass plus the latent heat of vaporization of the liquid present in the wet solid material. The liquid after being vaporized is usually swept away with air or an inert gas in dryers that utilize heated surfaces or by the hot gasses themselves in dryers which function by direct contact drying.

While the primary types of dryers mentioned are satisfactory and have achieved wide commercial acceptance, they are generally somewhat undesirable from the viewpoint of efficiency with respect to heat utilization. For example, in known heated surface evaporators and dryers employing direct contact with hot gasses, the vaporized liquid from the wet solid material is generally simply removed, collected and optionally condensed without any utilization of the latent heat energy possessed thereby. Consequently, such known systems are disadvantageous in this respect, as well as requiring large amounts of heat energy to provide a substantially dry product, and there exists a need for providing a drying process for a wet solid material and an apparatus for achieving the same which do not exhibit the above mentioned short-comings. The present invention fulfills this need.

BRIEF STATEMENT OF THE INVENTION

In accordance with this invention there is provided a process for drying wet solid material comprising introducing the wet solid material into a dryer bringing the wet solid material into contact with one side of a plurality of heated surfaces located in the dryer and vaporizing liquid contained in the wet solid material, withdrawing the vaporized liquid from the dryer and compressing the vaporized liquid to a pressure of at least from about 9 p.s.i.g. or more greater than the pressure in the dryer and returning the compressed vapor to the other side of the plurality of heated surfaces in the dryer, condensing the compressed vapor and vaporizing liquid contained in wet solid material on the opposite side of the plurality of heated surfaces with the latent heat of the condensate, and withdrawing the condensate from the plurality of heated surfaces and substantially dried solids from the dryer.

Further in accordance with this invention there is provided drying apparatus for carrying out the drying process which comprises a housing, entrance and exit openings located at opposite ends of the housing, means for delivering material to be dried into and dried material from the housing disposed in the respective openings and closing and isolating the interior of the housing substantially completely from the outside atmosphere, a plurality of hollow heat exchange means located in the interior of the housing and connected to an external heat source and to the atmosphere, and compressor means for withdrawing vaporous materials from the housing and compressing the vaporous materials connected to the housing in the vicinity of the entrance opening and to the plurality of hollow heat exchange means.

THE DRAWINGS

In order to illustrate the process and apparatus of this invention more fully, attention is directed to the accompanying drawings which are to be taken in conjunction with the following description and wherein.

DESCRIPTION OF THE PREFERRED EMBODIMENTS

It is to be understood that in its broad aspects the present invention incorporates a compressor and a heated surface evaporator or dryer, the compressor taking the vaporized liquid as it is driven from the wet solids material at the pressure in the dryer interior, which is generally substantially atmospheric pressure, and compressing it in a range of from about 9 to about 20 p.s.i.g. additional pressure. The higher pressure vapor is then used at the heat source for the purpose of heating the heated surfaces and as it condenses, the latent heat energy therefrom heats the wet solid material adjacent the opposite sides of the heated surfaces and vaporizes the liquid contained therein while a portion of the higher pressure vapor is passed directly into the housing of the dryer and through solid material therein to aerate the same and expedite flow through the dryer.

A primary factor to be considered in carrying out the process of this invention with the apparatus thereof is vapor loss. The dryer apparatus should be vapor tight so that vaporous material is not lost if the dryer is operated above atmospheric pressure or air is sucked in if it is operated below atmospheric pressure.

The Drying Apparatus

Figure 1:
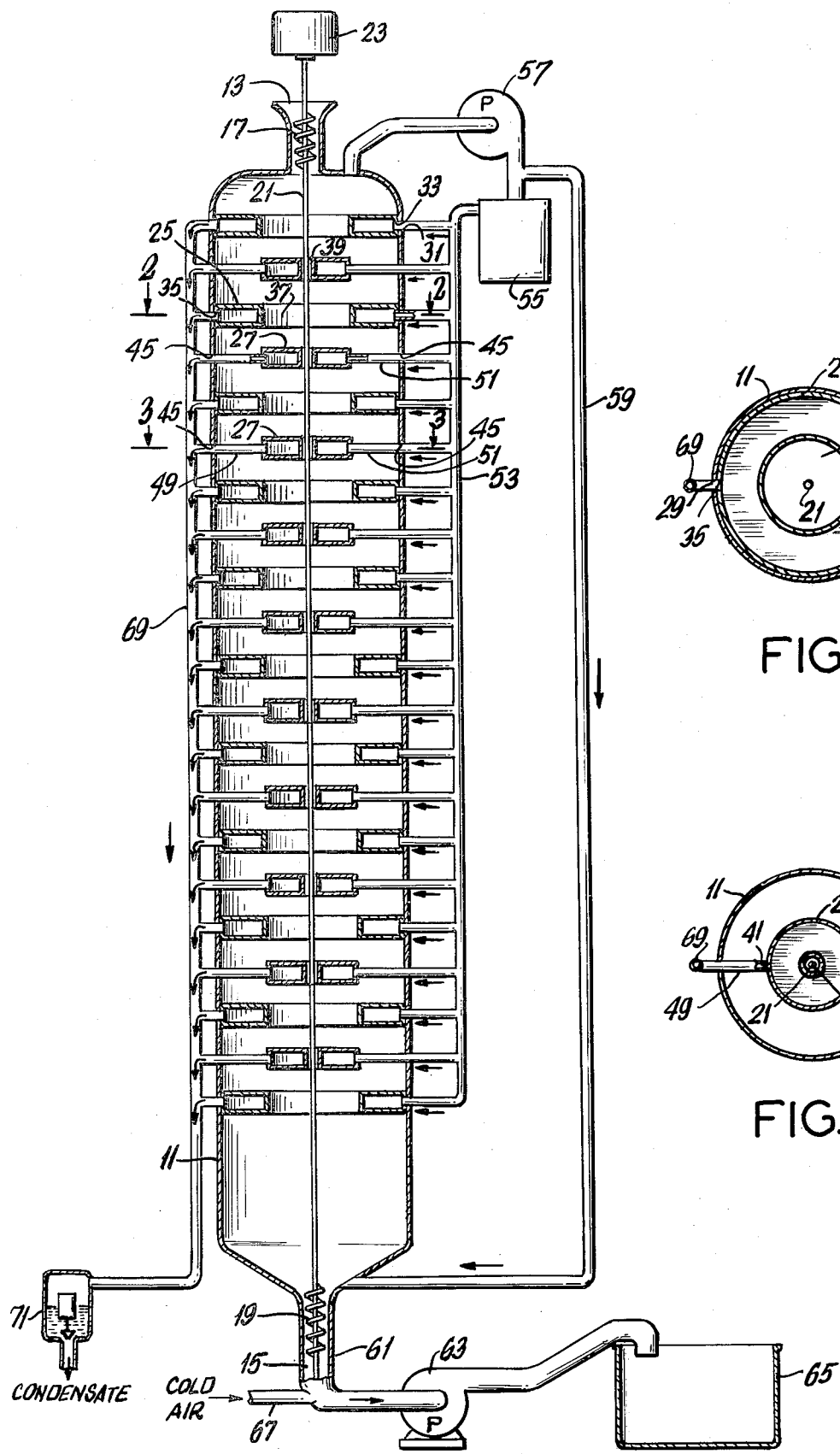
FIG. 1 is a view in elevation of a drying apparatus in accordance with the invention suitable for acomplishing the process and showing in detail the interior arrangement and disposition of the hollow heat exchange means.

Turning more particularly to FIG. 1, the drying apparatus comprises a generally circular housing 11 which may be made of any suitable material such as stainless steel or the like. The housing is provided with entrance and exit openings 13 and 15, respectively. Means for delivering material to be dried into and dried material from the housing such as screw conveyors 17 and 19, respectively, are disposed in the openings 13 and 15, closing and isolating the interior of housing substantially completely from the outside atmosphere. It is to be understood that the interior of the housing should be substantially vapor tight so that vapor in the housing is not lost if the pressure in the housing is above atmospheric or, if below atmospheric, air will not be sucked into the housing. In this connection, the means such as screw conveyors 17 and 19 are made to fit with close tolerances in the openings 13 and 15. The screw conveyors are connected by a rod 21 passing through the central axis of the housing and are driven by an external power source 23.

A plurality of hollow heat exchange means, which are of metal construction and some of which are hollow donut-shaped trays such as shown at 25 and some of which are hollow disk-shaped trays such as shown at 27 are disposed along the interior of the housing.

The hollow donut-shaped trays, such as shown at 25, are circular and fixed to the interior wall of the housing in any convenient manner, such as by supports (not shown).

Figure 2:
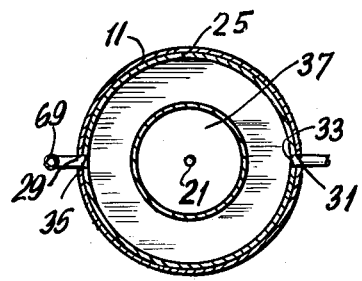
FIG. 2 is a plan view in detail of a hollow heat exchange means supported on the interior wall of the housing.

The donut-shaped trays have a diameter substantially equal to the internal diameter of the housing and are provided with two circumferential openings such as shown at 29 and 31 in FIG. 2 which are substantially opposite each other and aligned with openings such as shown at 33 and 35, respectively, in the housing 11. In addition, the central openings of the donut-shaped trays such as shown at 37 of FIG. 2 are relatively large, the main body portion of the trays extending inwardly from the circumferential periphery towards the center axis of the housing for a distance equal to about one-half to three-quarters of the radius of the housing.

Figure 3:
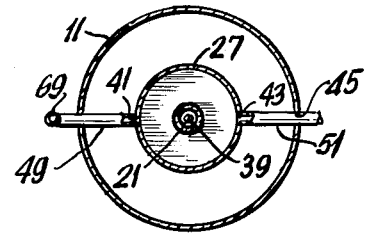
FIG. 3 is a plan view in detail showing a hollow heat exchange means supported along the rod which lies along the central axis of the housing.

In contrast, the hollow disk-shaped trays which are likewise circular, have relatively small central openings such as shown at 39 in FIG. 3 with the main bodies of the disks extending outwardly from the central axis of the housing for a distance equal to about one-quarter to one-half the radius of the housing. The hollow disk-shaped trays are fixed to the interior wall of the housing in any convenient manner, such as by supports (not shown).

In addition, the hollow disk-shaped trays are provided with openings 41 and 43, as shown in FIG. 3 which cooperate with openings such as shown at 45 and 47 in the housing 11, being connected thereto through lines or conduits 49 and 51.

It is to be understood that seals, collars or other suitable joints or the like are employed to isolate the main body of the interior of the dryer housing at those locations where the openings in the trays and the housing and/or conduits and the housing join each other.

As can be seen from referring to FIG. 1 the interiors of the trays connect through openings in the housing such as shown at 35 and 47 to the outlet manifold 69 and liquid trap 71. On the other hand, the interiors of the trays are connected through openings in the housing such as shown at 33 and 45 through manifold means 53 to an external source of live high pressure steam 55 which in turn is connected in any convenient manner upstream therefrom to compressor means 57 which is connected to the interior of the housing 11 in the vicinity of the entrance opening 13 in any convenient manner.

It is to be understood that where the hollow heat exchange means, such as the described trays are heated by an external source of heat other than steam, such as, for example from an electrical source, the compressor may be directly connected to the interior of the trays through manifold means 53.

In a preferred form of apparatus, means such as conduit or line 59 connects compressor means 57 directly to the interior of the dryer from its downstream or compression side so that a portion of compressed vaporous material removed from the interior of the dryer can be returned directly into the interior of the dryer and directly into contact with solid material moving through the dryer to aerate the same and facilitate the movement of the solid material through the drier.

In addition, conduit or line 61 provided with a suitable pump 63 is provided at the exit end of the dryer to lead the dried material to collection or storage bin 65. Conduit or line 61 is provided with a lead-in conduit 67 connected to a source of cold air (not shown) which serves to further cool the dried material and aid in moving it into bin 65.

The Process

While the drying process of this invention, as set forth broadly above, can be carried out under widely varying temperatures and pressures, it is to be understood that the temperature of the heated surfaces should be at least high enough so that vaporization of liquid contained in the wet solid material brought into contact with the heated surfaces will occur. On the other hand, the temperature should not be so high that it results in burning or decomposition of the solid material from which the contained liquid is driven by vaporization. Moreover, the particular temperature range suitable for drying a particular wet solid material in accordance with the process of this invention will be dependent upon the solid material per se and the liquid contained therein and is readily determinable by routine experimentation and calculation. In general, however, temperatures in a range of from at least the temperature sufficient to cause vaporization of the liquid contained in the wet solid material being dried up to about 300° F. or more are generally employed in carrying out the process of this invention. Furthermore, the heated surfaces located in the dryer can be brought to the desirable temperature from any convenient outside source. For example, such heat may be, and is preferably, derived from an external source of live high pressure steam.

Like the temperature, the pressure employed in carryout out the drying process of this invention may vary widely. The pressure within the dryer may be simply atmospheric pressure, or lesser or greater that atmospheric pressure. In general, however, the pressure employed within the dryer is generally at or near atmospheric pressure. On the other hand, the vaporized liquid is withdrawn from the dryer at a positive pressure at least sufficient to move the vaporized liquid from the dryer, after which it is compressed to an additional pressure of from at least about 9 p.s.i.g. or more greater than the pressure in the dryer and preferably to a pressure of at least about 20 p.s.i.g. or more greater than the pressure in the dryer. Compression results in increased heat energy. While the particular amount of increased heat energy achieved will depend upon the particular vaporized liquid being compressed as well as the particular amount of pressure increase to which it is subjected by compression, the increased heat energy achieved and thus the increase in heat efficiency for any given vaporized liquid is readily determinable by calculation. For example, where the liquid is water, which has about 1000 BTU's per pound of latent heat, the energy required to compress vaporized steam through a 20 p.s.i.g.

increase is about 100 BTU's per pound, thus giving the equivalent of about a ten-fold increase in heat efficiency.

As previously mentioned, the compressed vapor is then returned to the other side of the plurality of heated surfaces in the dryer where condensation thereof takes place and the latent heat thereof is released and vaporizes liquid contained in wet solid material on the opposite side of the plurality of heated surfaces, the condensate then being withdrawn from the heated surfaces and discarded or recovered and used for other purposes as desired. In this connection, it is to be understood that when carrying out the process of this invention where the plurality of heated surfaces located in the dryer are heated from an external source of heat other than steam, such as, for example, an electrical source, the compressed vaporous liquid is led directly from the compressor to the plurality of heated surfaces. On the other hand, where the external heat source is live high pressure steam, compression takes place upstream from the source of steam and the compressed vapor is led to the plurality of heated surfaces with ingoing steam. In both cases, however, the heat exchange means are brought to the desired temperature by the steam or other external source of heat and by the latent heat of the compressed vaporized material, thus providing increased heat utilization or efficiency.

A wide variety of wet solid materials may be dried with the process and apparatus of this invention. In general, any wet solid material which contains vaporizable liquid can be dried in the apparatus in accordance with the process. As exemplative, but not limitative, materials, there may be mentioned proteinaceous materials such as fish meal containing essentially alcohol as the liquid, as well as other proteinaceous materials containing essentially alcohol and/or water as the liquid. Another exemplative solid material is stillage resulting from the fermentation of grains in the manufacture of various products such as distilled spirits, beer and the like which generally contains essentially water as the liquid. Numerous other wet solid materials which can be readily dried by the process of this invention utilizing the apparatus thereof will be readily apparent to those skilled in the art.

It is to be understood that this invention is not to be limited to the embodiments disclosed herein, there being many variations thereof which can be made without departing from the spirit and scope of the inventive concept hereof as defined in the appended claims.

What is claimed is:

1. A process for drying wet solid material comprising introducing said wet solid material with the exclusion of air into a dryer at above atmospheric pressure, bringing said wet solid material into contact with the outside surfaces of a plurality of hollow plates located in said dryer, heated within by condensing recirculated vapor and vaporizing liquid contained in said wet solid material, withdrawing the vaporized liquid from the solid inlet end of said dryer and compressing said vaporized liquid to a pressure of at least from about 9 p.s.i.g. or more greater than the pressure in said dryer and returning he compressed vapor to the inside cavity of the said plurality of hollow plates in said dryer, condensing said compressed vapor within the hollow plates and vaporizing liquid contained in wet solid material on the outside surfaces of said plurality of hollow plates with the latent heat of the condensing compressed vapors, and withdrawing the condensate from the inside of said plurality of hollow plates and substantially dried solids from said dryer.

2. A process according to claim 1 wherein about 15 percent or more of the compressed vapor with 40° F. or more super heat is recirculated directly into the solid outlet end of the dryer and into direct contact with said material moving through said dryer.

3. A process according to claim 1 including using a source of steam connected to the plurality of heating elements located in the dryer to start the drying cycle, then shutting off said steam as the compressor is turned on.

4. A process according to claim 1 including heating the plurality of heated surfaces located in the dryer with electric heaters to start the drying cycle, then turned off once the compressor is operating.

5. A process according to claim 1 wherein the vaporized liquid is compressed to a pressure of at least about 20 or more p.s.i.g. greater than the pressure in said dryer.

6. A process according to claim 1 wherein the solid material is fish meal and the liquid contained therein is essentially alcohol.

7. A process according to claim 1 wherein the solid material is protein and the liquid contained therein is essentially alcohol.

8. A process according to claim 1 wherein the solid material is protein and the liquid contained therein is essentially a mixture of alcohol and water.

9. A process according to claim 1 wherein the solid material is from stillage and the liquid contained therein is essentially a mixture of alcohol and water.

10. A process for drying wet solid material comprising introducing said wet solid material with the exclusion of air into a dryer at above atmospheric pressure, bringing said wet solid material into contact with the outside surfaces of a plurality of heated hollow heat exchange means located in said dryer and heated within by condensing recirculated vapor, and vaporizing liquid contained in said wet solid material, withdrawing the vaporized liquid from the solid inlet end of said dryer and compressing said vaporized liquid to a pressure in a range of from at least about 9 to about 20 or more p.s.i.g. greater than the pressure in said dryer, returning the compressed vapor to said dryer to the inside cavity of the said plurality of said heated hollow heat exchange means, condensing said compressed vapor within said heated hollow heat exchange means and vaporizing liquid contained in wet solid material on the outside surfaces of said heated hollow heat exchange means with the latent heat of the condensing compressed vapors and withdrawing the condensed liquid from within said hollow heat exchange means and substantially dried solids from said dryer while recirculating a portion of said compressed and superheated vapor directly through said dryer in direct contact with solid material moving through said dryer.

11. A process according to claim 10 wherein about 15 percent of the compressed vapor taken directly from the compressor discharge and highly superheated is recirculated directly into the solid discharge end of the dryer and into contact with solid material moving through said dryer.

12. Drying apparatus comprising a housing, entrance and exit openings located at opposite ends of said housing, means for delivering material to be dried into and dried material from said housing disposed in the respective openings and closing and isolating the interior of said housing substantially completely from the outside atmosphere for operation above atmospheric pressure, a plurality of hollow heat exchange means located in the interior of said housing and connected to an external source of steam and to the atmosphere for discharge of condensate, and compressor means for withdrawing vaporous materials from said housing at the solid inlet end thereof and compressing said vaporous materials for delivery to or return of at least a first portion thereof to said heat exchange means and a second portion thereof to the interior of said dryer housing in the vicinity of said solid discharge opening.

13. Drying apparatus comprising a housing, entrance and exit openings located at opposite ends of said housing, means for delivering material to be dried into and dried material from said housing disposed in the respective openings and closing and isolating the interior of said housing substantially completely from the outside atmosphere for operation above atmospheric pressure, a plurality of hollow heat exchange trays located in the interior of said housing and connected to an external source of steam and to the atmosphere for discharge of condensate, compressor means for withdrawing vaporous materials from said housing at the solid inlet end thereof and compressing said vaporous materials, for delivery to an additional vessel such as a distillation column in the vicinity of the solid discharge opening and provided with a superheated steam connection and means connecting the interior of said housing and said compressor means directly with each other for passing at least a portion of compressed vaporous material directly from said compressor means to the interior of said housing.

14. Drying apparatus comprising a housing, entrance and exit openings located at opposite ends of said housing, means for delivering material to be dried into and dried material from said housing disposed in the respective openings and closing and isolating the interior of said housing substantially completely from the outside atmosphere, a plurality of hollow heat exchange trays located in the interior of said housing and connected to an external heat source and to the atmosphere, said hollow heat exchange trays being supported on the interior wall of said housing, at least some of said hollow heat exchange trays extending around the interior wall of said housing and inwardly towards the center thereof and having large central openings and the others of said hollow heat exchange trays having small central openings and extending outwardly partially toward the interior wall of said housing and being alternately disposed along the interior of said housing with respect to the trays having large central openings, compressor means for withdrawing vaporous materials from said housing and compressing said vaporous materials connected to said housing in the vicinity of the entrance opening and to said plurality of hollow heat exchange trays and means connecting the interior of said housing and said compressor means directly with each other for passing at least a portion of compressed vaporous materials directly from said compressor means to the interior of said housing.

15. Drying apparatus according to claim 14 including a source of live high pressure steam located between the compressing means and the plurality of hollow heat exchange trays located in the interior of said housing.

16. Drying apparatus as defined in claim 14 wherein the means for delivering material to be dried into and dried material from the housing disposed in the respective entrance and exit openings are screw feeders.

* * * * *